Feb. 20, 1951   W. J. HABGOOD   2,542,135
MACHINE FOR CLOSING AND SEALING BAGS
Filed Oct. 16, 1946   7 Sheets-Sheet 1

Fig.1

WARREN J. HABGOOD
INVENTOR.

BY

Feb. 20, 1951  W. J. HABGOOD  2,542,135
MACHINE FOR CLOSING AND SEALING BAGS
Filed Oct. 16, 1946  7 Sheets-Sheet 3

WARREN J. HABGOOD
INVENTOR.

WARREN J. HABGOOD
INVENTOR.

Feb. 20, 1951 W. J. HABGOOD 2,542,135
MACHINE FOR CLOSING AND SEALING BAGS
Filed Oct. 16, 1946 7 Sheets-Sheet 5

Fig. 5

WARREN J. HABGOOD
INVENTOR.

BY

Feb. 20, 1951 W. J. HABGOOD 2,542,135
MACHINE FOR CLOSING AND SEALING BAGS
Filed Oct. 16, 1946 7 Sheets-Sheet 6

Fig. 6

WARREN J. HABGOOD
INVENTOR.

BY

Feb. 20, 1951 W. J. HABGOOD 2,542,135
MACHINE FOR CLOSING AND SEALING BAGS
Filed Oct. 16, 1946 7 Sheets-Sheet 7

WARREN J. HABGOOD
INVENTOR.

BY

Patented Feb. 20, 1951

2,542,135

UNITED STATES PATENT OFFICE 2,542,135

MACHINE FOR CLOSING AND SEALING BAGS

Warren James Habgood, Millbourne, Pa.

Application October 16, 1946, Serial No. 703,646

1 Claim. (Cl. 93—6)

This invention relates to a machine for the automatic closing and sealing of bags or similar containers, in particular bags or the like provided with portions, at least, which are sealable by the application of heat and pressure.

It is an object of this invention to provide such a machine which will successively and continuously subject a series of bags or similar containers already filled with a commodity, to the necessary operations to close and seal the same, at an economically high rate and with a minimum use of hand labor. It is a further object to provide, in a machine of this character, facilities which will enable it to close and seal filled bags which are already inserted in a carton, and fold and tuck the sealed bag mouth into such carton, in preparation for the closing and sealing of such carton to form a finished package.

An additional object of the invention is to provide a machine of the kind referred to which will be extremely flexible in its capabilities, in that it may readily be adjusted to handle and to operate upon, bags of many different shapes and sizes, in accordance with the requirements of the users of such machines. An ancillary object is to devise a machine of the general character indicated which may readily be incorporated into existing production lines, with a minimum of modification of existing equipment, so that its benefits may be obtained without substantial rebuilding of existing facilities which do not of themselves provide the functions indicated above.

A still further object of the invention is to accomplish the above ends by the simplest possible means, in order to reduce the expense of constructing the machine, as well as to enable it to be serviced or maintained with a minimum of trouble, even by relatively inexperienced persons.

The above and other objects and advantages of the invention will best be understood from the following detailed description of one specific and preferred embodiment thereof, taken in connection with the accompanying drawings, in which—

Figure 1:
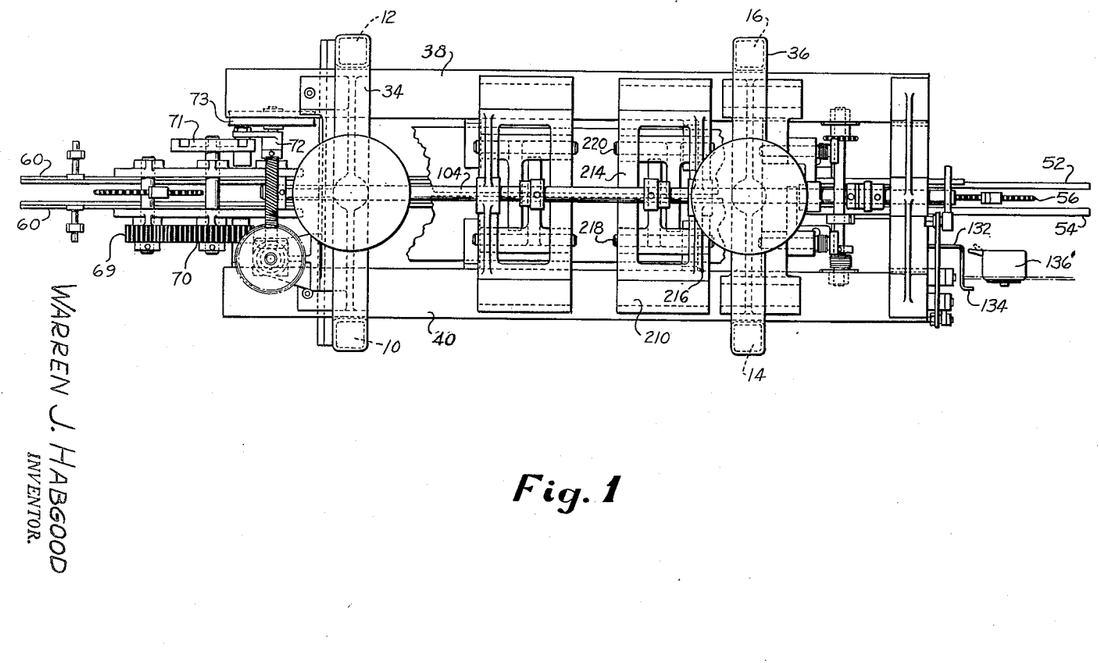
Fig. 1 is a plan view of a machine in accordance with the invention.
Figure 2:
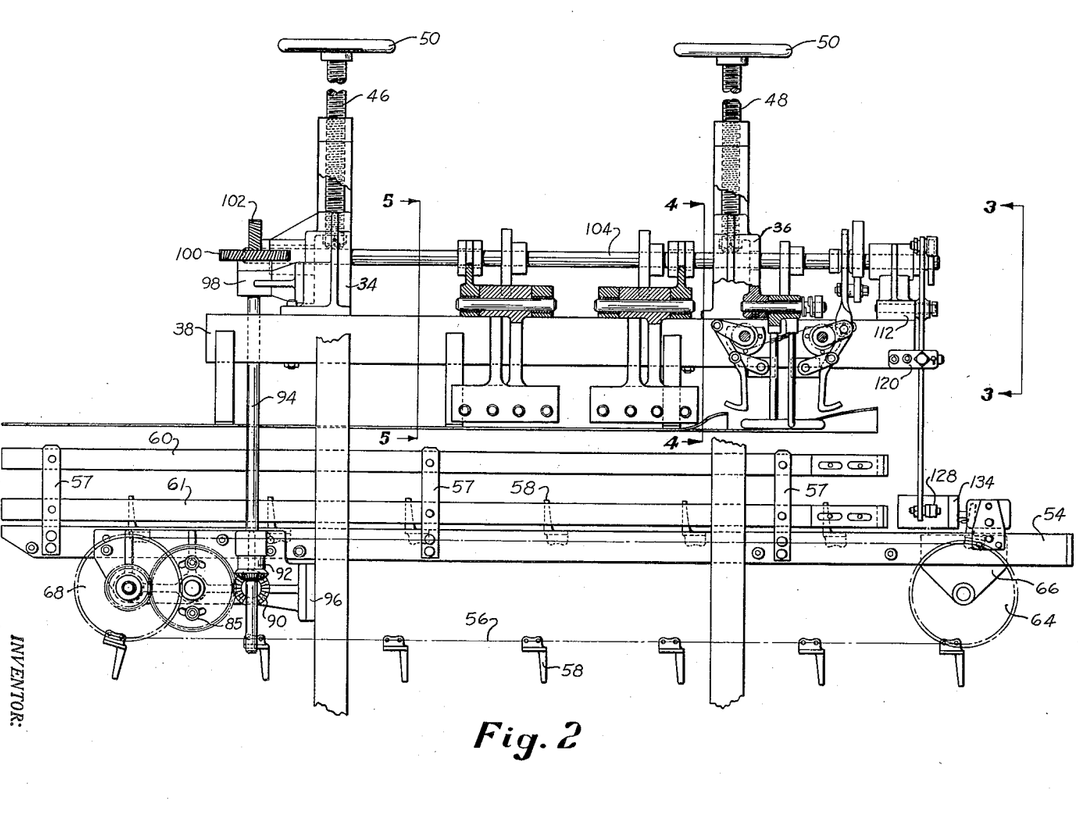
Fig. 2 is a side elevation of the same.
Figure 6:
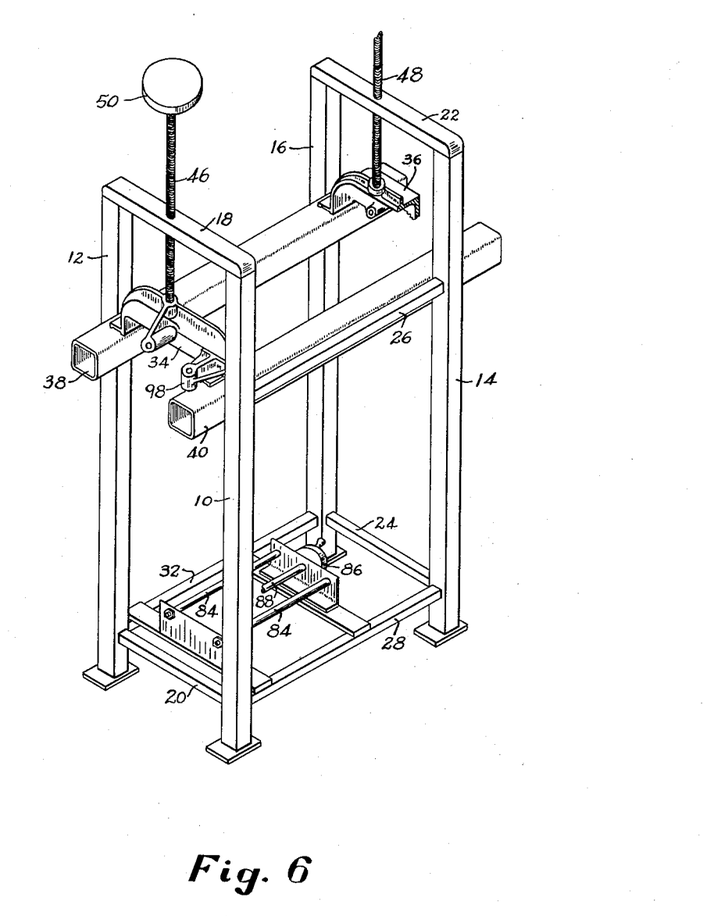
Fig. 6 is a perspective view of the framework of the machine.

Referring now to Figs. 1, 2 and 6 of the drawings, the supporting structure of the machine comprises four upright pillars 10, 12, 14 and 16, which may be bolted to the floor or other basic support in any desired manner. Pillars 10 and 12 are interconnected by upper and lower transverse braces 18 and 20, and pillars 14 and 16 are likewise interconnected by an upper transverse brace 22 and a lower transverse brace 24. Similarly, pillars 10 and 14 are interconnected by upper and lower longitudinal braces 26 and 28, while pillars 12 and 16 are connected by an upper longitudinal brace not shown, and a lower longitudinal brace 32. The principal operative mechanism of the machine is supported, in a more or less floating manner, from two longitudinal girders 38 and 40, connected transversely of the machine by brackets 34 and 36 respectively, which brackets are supported from the corresponding top girders 18 and 22 by means of screws 46, 48, each of these screws being threadedly received in its corresponding top girder, but passing freely through its corresponding bracket and provided with a fixed nut. A hand wheel 50 is provided for each screw, whereby the girders 38 and 40 may be raised and lowered to move the mechanism supported therefrom and adapt the machine to cartons and bags of various heights.

Figure 3:
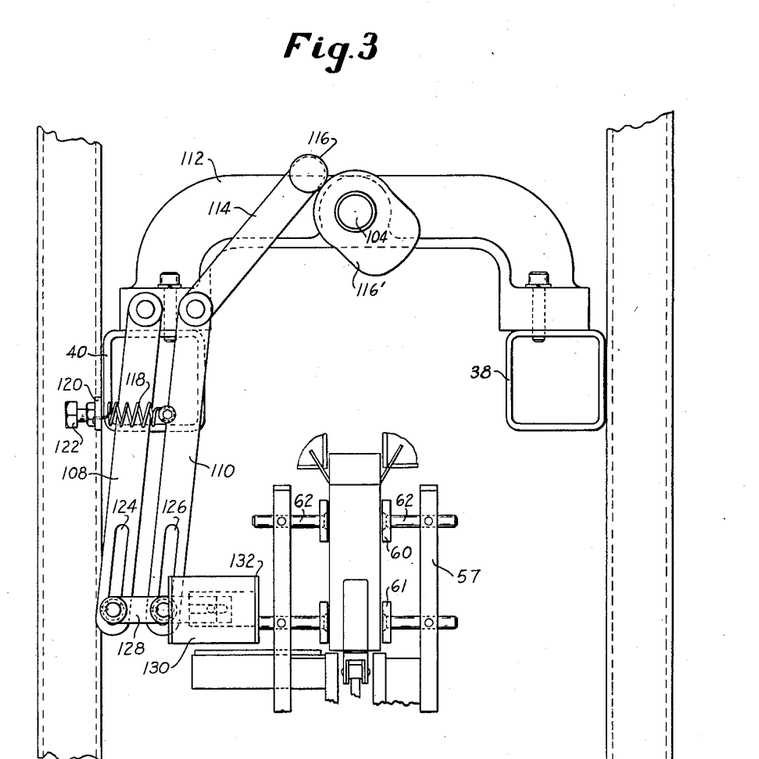
Fig. 3 is an end view, with parts broken away, looking in the direction of arrows 3—3 of Fig. 2.

Supported from the side pillars 10 to 16, at a fixed height from the floor or base of the machine, are a pair of longitudinal bars 52, 54, in the space between which operates the upper pass of a sprocket chain 56, at intervals along which are secured paddle members 58 adapted to transport the cartons along the machine and to and from the successive operational stations to be described below. Each of the bars 52 and 54 carries a plurality (here three) of vertical members 57, which support upper and lower fence or guide strips 60 and 61, which act to maintain the cartons, during transport from station to station, in the required orientation. As shown in Fig. 3, members 57 support the guide members through the intermediary of rods 62 or the like, which are adjustably received in such members 57, whereby the distance between opposed guide members may be readily adjusted to accommodate cartons of various widths.

At the receiving end of the machine, which is the right hand end as seen in Figs. 1 and 2, the sprocket chain 56 passes over a sprocket wheel 64 mounted upon a bracket 66 depending from the longitudinal bars 52 and 54. At the other end of the machine, the sprocket chain passes over and is driven by a sprocket wheel 68 which in turn is driven through gears 69 and 70 by a usual form of intermittent or Geneva wheel 71. The driving arm of the intermittent mechanism is indicated at 72, and is fixed on a cross shaft which is continuously driven by a pulley 73 belted to a driving motor (not shown). The motor and drive unit are preferably mounted upon cross bars or angle shapes which in turn ride upon longitudinal bars 84 secured to the braces 28 and 32 described above; a usual form of variable speed pulley is connected to the motor to permit adjusting the machine speed. Adjustment of the drive motor to maintain belt tension for different conditions of wear is accomplished by rotating a hand wheel 86 secured to a threaded shaft 88 connected to the motor carriage in a known way. Mounted on the same shaft as carries arm 72 is a right-angle bevel gear 90 which engages a similar gear 92 which has a splined connection with a vertical shaft 94 which transmits operating power to the various overhead station mechanisms as will be pointed out below.

The sprocket wheel 69, gear 70 and arm 72, and bevel gear 92 are all rotatably mounted upon a bracket 96 which extends between and is secured to the forward upright pillars 10 and 12.

Bracket 34 which, as described above, extends between the floating girders 38 and 40 in the region between pillars 10 and 12, has affixed thereto a second bracket 98 which rotatably receives the upper end of shaft 94, and to which latter is keyed a spiral gear 100 which meshes with a similar gear 102 at a right angle thereto and keyed to a central, horizontal drive shaft 104 journalled in bearing portions of the brackets 34 and 36. This shaft 104 extends over the tops of the various operative stations, and operates to supply motive power to the mechanisms of such stations, in timed relation to the movement of the conveyor sprocket chain 56. The gearing 70, 72 is so adjusted, in the present embodiment, that an advance of the conveyor sufficient to move a box or carton from one station to the next succeeding station corresponds to one-quarter of a revolution of the overhead shaft 104, and the positive nature of gearing 70 and 72, as well as of the bevel gears 90, 92 and the spiral gears 100, 102, prevents any possibility of a lack of synchronism between the conveyor and the overhead mechanisms. In order to provide for small adjustments in the relative phases of the conveyor and the overhead mechanisms, for example, to enable the machine to be initially set up with the paddles 58 in precisely correct position with respect to the vertical center line of each station, the usual bolt and arcuate slot connection 85 may be provided in the gear train 69 and 70.

From the above description, it will be seen that, during one-quarter of a revolution of the overhead shaft 104, the conveyor is operated to advance the cartons being operated on a distance equal to the spacing between stations, and the remaining three-quarters of a revolution of such shaft is therefore available for operating the mechanisms of such stations. The rotation of shaft 102 is, of course, continuous, since the gearing 90, 92 is on the same shaft as pulley 73.

Reading from right to left in either of Figures 1 or 2, that is, in the direction of carton advance, the stations represented in the present embodiment are (1) a transfer station at which the cartons, each containing a filled but open mouth bag, are transferred from an existing conveyor line to the starting position of the conveyor of the present machine, (2) a collapsing station at which the mouth of the filled bag is collapsed in preparation for sealing, and at which also the carton flaps are pushed down so as to be out of the way of the sealing jaws, (3) a heat sealing station at which the bag mouth is gripped between two heated jaws to form a tight closure seal, (4) a cold press station at which the sealed bag mouth is engaged by a pair of jaws at room temperature or below, to set the sealing material, and (5) a tuck-in station at which the sealed bag mouth is folded over and tucked down into the carton preparatory to closing the latter.

In order to fit the machine of the present disclosure into an existing conveyor line, it is, of course, necessary to transfer the filled but enclosed cartons (each having a filled but unclosed bag therein) from the existing line without interference between the paddles or other conveying means of the two lines. To accomplish this, the present machine provides, at its entering end, a transfer mechanism which is adapted to move the cartons from the existing line in a direction at right angles thereto, and onto the conveyor mechanism of the machine herein disclosed. To this end, there is mounted at the right-hand end of floating girder 40, a double-arm parallel linkage comprising the parallel links 108 and 110 pivoted to a bracket 112 bolted to girders 38 and 40, said bracket providing a centrally located bearing for one end of shaft 104. Link 110 has integral therewith an upwardly extending arm 114 bearing at its end a roller 116 adapted to be engaged by a cam 116' secured to shaft 104, whereby the links 108 and 110 are swung to the right (Fig. 3) once for each revolution of the shaft 104, and then returned to the left under the pressure of a spring 118 secured to link 110 at one end and to a bracket 120 on girder 40 at the other. A back stop screw 122 limits the leftward travel of the linkage by engaging arm 108, and provides an adjustment for the total travel of the linkage in each cycle. At their lower ends, links 108 and 110 are slotted as at 124 and 126, each slot receiving a pivot pin which is in turn pivoted in a hole in a pusher member 128, which thereby executes a back and forth motion upon rotation of the parallel linkage. The pivot pins are adjustable lengthwise of the links 108 and 110, by virtue of the slots 124 and 126, so that the pusher member may be made to strike a carton at a desired position with respect to its center of gravity to provide a smooth, non-tipping lateral transfer of such carton onto the conveyor mechanism.

Secured to the front end of pusher member 128 is a shoe 130 which has a carton-contacting face 132 and, in a plane at right angles to face 132, a portion 134. As best seen in Fig. 1, the purpose of portion 134 is to block the carton on the existing conveyor which is just behind the carton being transferred, and prevent it from passing behind shoe 130, which it would otherwise do since the existing conveyor is moving continuously. A carton timer 136' is provided, which operates in timed relation to the pusher 128 and serves to prevent a carton from being half entered into the transfer station on the forward stroke of the pusher, which would result in crushing of cartons and fouling of the conveyor line.

A carton having been received upon the conveyor due to the action of the mechanism just described, the next forward step of the conveyor will convey the same, through the intermediary of a paddle 58, to the collapsing station located just to the left of the transfer station, as shown in Figs. 1 and 2. This collapsing station, as shown in the present disclosure, is particularly adapted to operate upon a carton which contains a gusseted bag whose open mouth extends upwardly above the level of the tops of the carton flaps, which flaps also extend almost straight up, forming in effect, vertical continuations of the carton walls. The mechanism at the collapsing station, as here disclosed, therefore provides for tucking in the gussets of the bag mouth, bringing the opposite sides of the mouth substantially into contact, and simultaneously bending down the front and rear carton flaps in preparation for the operations at the next station. However, it will be understood that similar mechanism may be designed so as to draw the mouth of a plain or gusseted bag into an elongated fin rather than to collapse the gussets, and I, therefore, do not wish to be limited to the particular operations to be described below.

The principal operative parts of the collapsing station are supported from or upon the cross bracket 36 described above as connecting the beams 38 and 40.

Figure 3A:
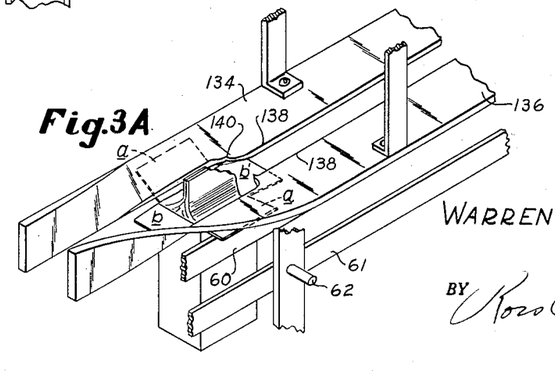
Fig. 3A is a partial perspective view of the carton-flap deflecting rails.

As the cartons are received by the machine, the four usual closure flaps at the top of each carton extend in a generally upward direction, but at a slight inclination to the vertical, as indicated at $a, a$ in Fig. 3A. In order to depress all of these flaps and maintain them in depressed condition, so as to eliminate interference with the mechanisms to be described, there are provided a pair of guide strips 134 and 136, best shown in Fig. 3A. These strips are adjustably supported from the overhead structure in any desired manner, and lie for the most part with their flat faces in a horizontal plane. At the receiving end of the machine, however, the strips are each twisted so as to lie in a vertical plane; the lower edges of the vertical portions are substantially aligned with the inner edges of the horizontal portions. Side flaps $a, a$ of an entering carton are hence engaged by the strips and caused to turn downwardly as the carton moves along the line. The inner edge of each strip, just beyond the point at which the strips again curve into horizontal planes, is spaced inwardly as indicated at 138, and the resulting corner is turned or bent upwards as indicated at 140. The purpose of this offset in the inner strip edges is, that when the front and rear carton flaps $b, b'$ are depressed by mechanisms to be described, further motion of the carton will cause the leading flap $b'$ to pass under the inturned edges of the strips and thereafter be maintained in its turned down position of Fig. 3A. Also, of course, when the trailing flap $b$ passes under the same inner edges of the strips, it too will be held in turned down position.

Those parts of the collapsing station which operate to tuck in the gussets of the bag mouth and deflect the carton flaps $b, b'$ downward are mounted upon four cross shafts 150, 152, 154 and 156. Cross shafts 150 and 152 are journalled in the floating girders 38 and 40. Mounted on each of these shafts is a collar 158 carrying a crank arm 160. Shafts 154 and 156 are located beneath shafts 150 and 152, and are secured to brackets mounted at the lower edges of the same girders. Each of the latter shafts carries a collar 162 to which is secured a crank arm 164. Connecting the two forward crank arms 160 and 164 is a connecting arm 166 pivoted at the extremities of said crank arms, and extending downwardly to form a gusset-tucking portion 168 and a carton flap-deflecting portion 170. A similar but reversely curved connecting arm 172 is pivoted to the extremities of the two rearward crank arms 160 and 164. The two shafts 150 and 152 are inter-connected for rotation equal amounts in opposite directions by a chain or the like 174, connecting sprocket wheels 175 affixed to said shafts, and shaft 152 has a spring connection 176 which normally causes all of the four crank arms to occupy their uppermost positions. It will be observed that clockwise rotation of shaft 152 will cause the tucking and deflecting arms 166 and 172 to move inwardly and downwardly, thus acting to tuck in the gussets and immediately thereafter to depress the flaps of the carton to the desired folded-down position.

In order to produce the necessary rotation of the shafts 150 to 156, the outer extremity of crank arm 160 of shaft 152 is pivoted to one end of an operating link 178, whose other end is slotted as at 180 to encompass the drive shaft 104. Guiding collars are secured to the shaft 104 on opposite sides of link 178, and a cam member 182 secured to the shaft engages a cam roller 184 secured to an intermediate portion of the link.

Figure 4:
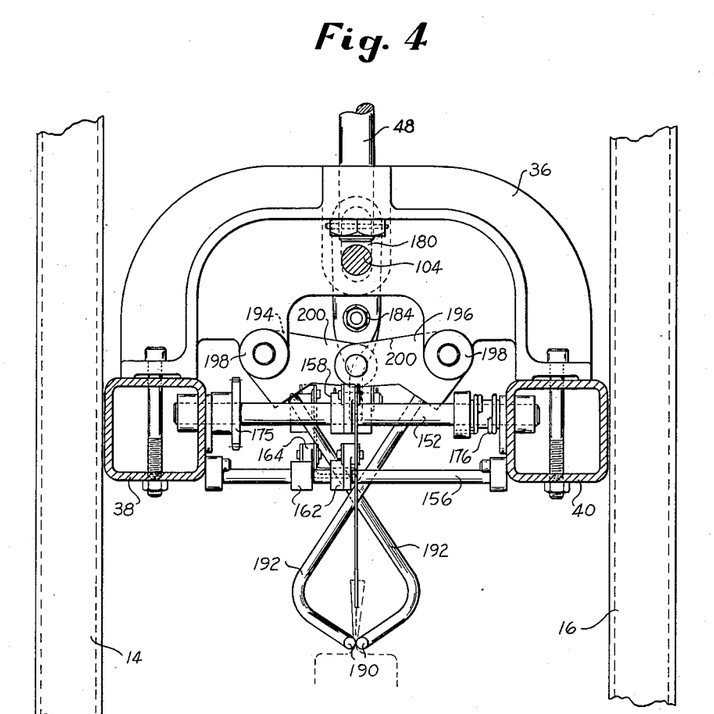
Fig. 4 is a sectional view, to a larger scale, taken on line 4—4 of Fig. 2.
Figure 4A:
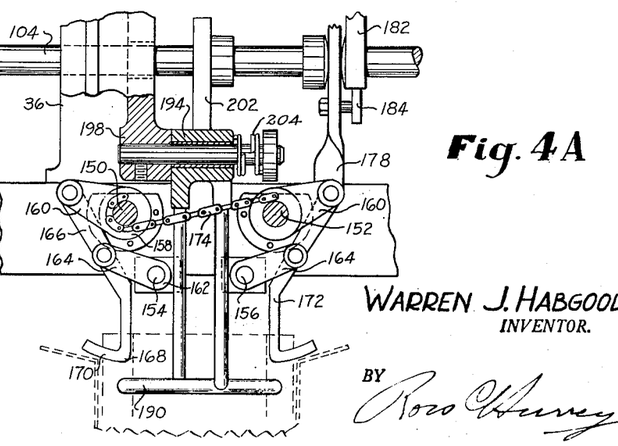
Fig. 4A is an enlarged, partially sectional elevation of the structure shown in Fig. 4.

In order to smooth and collapse the gusseted mouth of the bag after the gussets have been tucked in, and to bring the sides of the bag mouth substantially into contact in preparation for the heat sealing step, there are provided a pair of parallel clamping or compressing rods 190 which extend parallel to the long axis of the machine, and are carried by rods 192 respectively secured to crank members 194, 196 mounted for rotation in bosses 198 integral with the cross-brace 36 described above as connecting the tops of the pillars 14 and 16. Crank members 194 and 196 each have an inwardly extending arm 200 adapted to be engaged by a cam disc 202 secured to and rotating with shaft 104. Rotation of the cam disc 202 hence depresses both crank arms 200, and causes the rods 190 to engage the sides of the bag mouth and force the same toward one another in the manner shown in Fig. 4. Springs such as that shown at 204 are connected between each of the crank members 194 and 196 and the fixed rods 206 which support them, such rods being fixedly received in bores in the bosses 198 referred to above. Rods 190 dwell in and engage the sides of the bag during the beginning of the carton transfer and until the collapsed bag enters between flap guide strips 134 and 136. Rods 190 then retract to open position to permit the following carton and bag to enter collapsing station. Flap guides 134 and 136 will keep bag collapsed until sealed.

Figure 5:
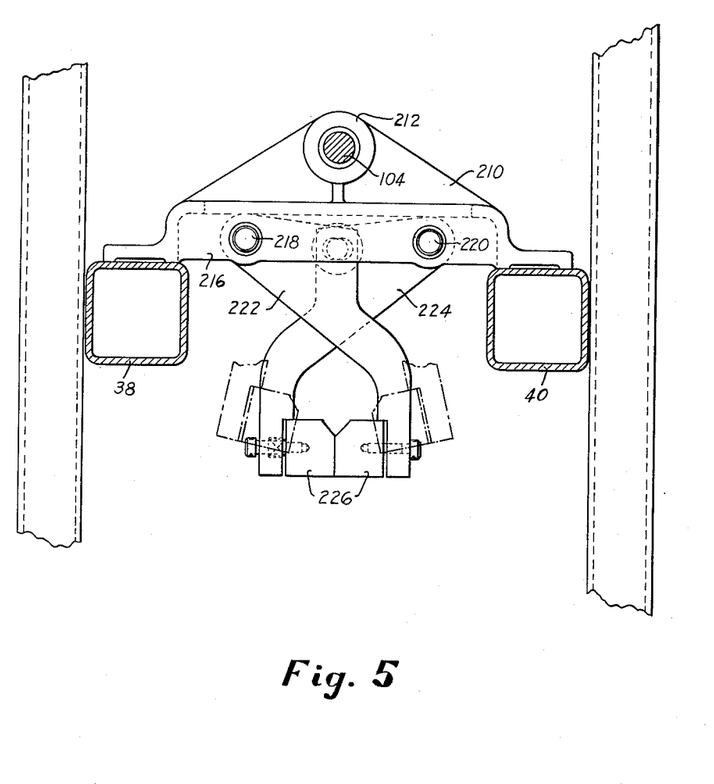
Fig. 5 is a sectional view taken on line 5—5 of Fig. 2.

A carton leaving the collapsing station is next moved by one conveyor step to position beneath the heat sealing mechanism shown in elevation in Fig. 5. As before, the overhead mechanism is supported from girders 38 and 40 by a cross bracket 210 which has a journal 212 supporting the mian shaft 104, and spaced transverse webs 214 and 216 in which are rotatably received shafts 218 and 220. Each of the shafts 218 and 220 carries a crank like arm, these arms being designated 222 and 224 respectively, and each having at its lower end a clamping jaw 226 adapted to be heated by any convenient means, such as an electric resistance type heater (not shown). Operation of the heated clamping jaws 226 from full to dash line positions shown in Fig. 5 is accomplished by a cam arrangement driven from shaft 104 and which may be similar to that shown in Fig. 4 for operating arms 200.

The next succeeding station is identical with the hot jaw station just described, except that the jaws are not provided with any heating means. Hence, a bag mouth which has been subjected to heat and pressure at the previous station will be subjected to pressure, without heat, at the last station, and the sealable material will be rapidly cooled to perfect the seal and prepare the same for any further operations which may be desired, and which may be carried out by further stations on the same conveyor line or by suitable mechanism constituting an independent machine to which the cartons and their bags are transferred from the present device. Since the hot jaw and cold jaw stations are, with the exception noted, structurally identical, it is considered unnecessary to describe the latter in any detail.

Figure 7:
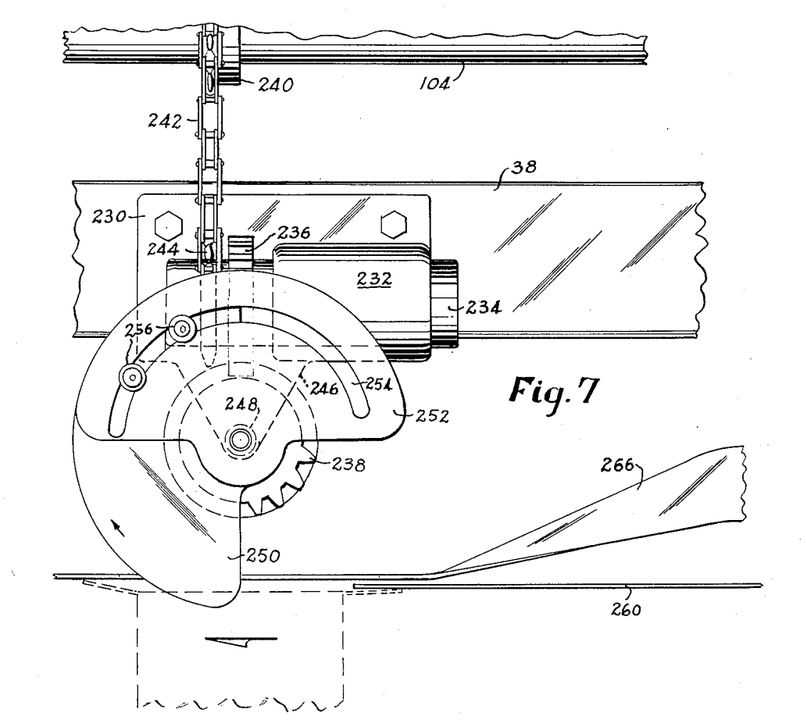
Fig. 7 is a view in elevation of the fold and tuck-in station.
Figure 8:
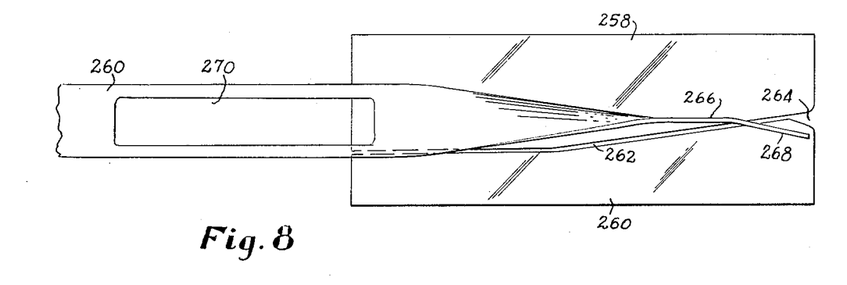
Fig. 8 is a plan view of the folding plates of Fig. 7.

The bag mouth having been sealed (and cooled) in the manner just described, movement of the conveyor now advances the bag and carton to the last station of the machine, which is best shown in Figs. 7 and 8, and where the closed and sealed bag mouth is folded over and tucked down into the carton, preparatory to the closing of the carton. As shown in Fig. 7, the mechanism of this station comprises a bracket 230 bolted to the horizontal support 38 and having a journal boss 232 in which is mounted for rotation a stub shaft 234 carrying one of a pair of helical right angle gears 236 and 238. Shaft 234 is rotated from the main drive shaft 104 by means of a sprocket wheel 240 secured to said drive shaft and connected by a link belt 242 with a sprocket wheel 244 fixed to stub shaft 234. A bearing member 246 depends from bracket 230 and has journalled therein a shaft 248 on which is secured the gear 238 meshing with gear 236. Also secured to shaft 248 are a pair of semicircular flat sectors 250 and 252, the latter being slotted arcuately as at 254. A pair of bolts or the like 256 pass through the slot and into the plate or blade 250, whereby the angular relation of the plates may be varied as desired.

In order to fold the sealed bag mouth into a horizontal plane, and to maintain the carton flaps down during the tuck-in operation, there are provided guide plates shown in Fig. 7 (and in plan view in Fig. 8), comprising a pair of plates 258 and 260 lying in the same horizontal plane and being profiled at their adjacent edges to provide, in effect, a guide slot 262 having a broadened mouth 264 at the entrance end. As a sealed bag mouth enters slot 262 from the right hand edge of Fig. 8, the direction of slot 262 causes it to be moved slightly to the left, looking in the direction of carton movement. However, a twisted deflecting plate 266 is mounted above the plane of plates 258 and 260, and as the bag mouth engages a camming front edge 268 of the deflecting plate, the bag mouth is caused to turn itself down to a horizontal position, by virtue of the fact that plate 266 is twisted from a vertical plane at its right end to a substantially horizontal plane at its left end, as shown in Figs. 7 and 8. When the carton reaches the position indicated in dashed lines in Fig. 7, the carton flaps are held down by the plates described above, ready for the tucking operation, which is performed by rotation of the tucker blades 250 and 252. It will be observed that a slot 270 is provided in the left hand portion of plate 266 to enable the tucker blades 250 and 252 to pass down through said plate and force the folded bag mouth down into the carton. Further movement of the conveyor then causes the carton to move out of the machine for further operations, such as closing and sealing the carton flaps, with which the present invention is not concerned.

From the above description of a preferred embodiment of my invention, it will be observed that I have provided a machine accomplishing all the stated objects of my invention in an efficient manner. However, I am aware that many modifications and changes in the structure can be made without departing from the spirit of the invention, and I therefore do not wish to be limited to the precise details shown and described, except as may be required by the scope of the appended claim.

I claim:

In a device of the class described, a conveyor, means for transferring a carton containing a filled heat-sealable bag onto said conveyor, means for collapsing the mouth of said bag, means for applying heat and pressure to the collapsed mouth of said bag to seal the same, means for applying pressure without heat to the sealed mouth to cool the same, means for folding and tucking the sealed mouth down into said carton, and a single drive shaft located entirely above said conveyor and operative to drive all of said means.

WARREN JAMES HABGOOD.

REFERENCES CITED

The following references are of record in the file of this patent:

UNITED STATES PATENTS

| Number | Name | Date |
|---|---|---|
| 1,141,156 | Tremaine | June 1, 1915 |
| 1,625,720 | Gangler | Apr. 19, 1927 |
| 1,824,401 | Kellogg et al. | Sept. 22, 1931 |
| 1,922,412 | Allen et al. | Aug. 15, 1933 |
| 2,011,198 | Morey | Aug. 13, 1935 |
| 2,018,807 | Richard | Oct. 29, 1935 |
| 2,045,230 | Howard | June 23, 1936 |
| 2,072,654 | Stagmeier | Mar. 2, 1937 |
| 2,094,061 | Cundall | Sept. 28, 1937 |
| 2,162,263 | Lindholm et al. | June 13, 1939 |
| 2,206,761 | Bergstein | July 2, 1940 |
| 2,309,760 | First | Feb. 2, 1943 |